United States Patent
Mizrahi

(10) Patent No.: US 10,216,220 B1
(45) Date of Patent: *Feb. 26, 2019

(54) ACCURATE TIME CAPTURE AND TRANSFER BETWEEN CLOCK DOMAINS

(71) Applicant: MARVELL ISRAEL (M.I.S.L) LTD., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 210 days.

This patent is subject to a terminal disclaimer.

(21) Appl. No.: 15/406,766

(22) Filed: Jan. 15, 2017

Related U.S. Application Data

(63) Continuation of application No. 13/847,736, filed on Mar. 20, 2013, now Pat. No. 9,547,332.

(60) Provisional application No. 61/613,842, filed on Mar. 21, 2012.

(51) Int. Cl.
G06F 1/12 (2006.01)

(52) U.S. Cl.
CPC ...................................... G06F 1/12 (2013.01)

(58) Field of Classification Search
CPC .......................................................... G06F 1/12
See application file for complete search history.

(56) References Cited

U.S. PATENT DOCUMENTS

| | | |
|---|---|---|
| 6,640,322 B1 | 10/2003 | Schulz |
| 7,007,186 B1 | 2/2006 | Li et al. |
| 9,547,332 B1 | 1/2017 | Mizrahi |
| 2003/0103486 A1 | 6/2003 | Salt et al. |
| 2012/0030495 A1 | 2/2012 | Chandhoke et al. |

FOREIGN PATENT DOCUMENTS

| | | |
|---|---|---|
| EP | 2 254 267 | 11/2010 |
| WO | WO 2012/065823 | 5/2012 |

OTHER PUBLICATIONS

Abstract of IEEE 802.1AS Standard, "802.1AS—Timing and Synchronization," The Institute of Electrical and Electronics Engineers, Inc., available at http://www.ieee802.org/1/pages/802.1as.html, 1 page. (Mar. 30, 2011).

(Continued)

*Primary Examiner* — Kim Huynh
*Assistant Examiner* — Eric Chang

(57) ABSTRACT

A first request signal that indicates a request for a time maintained by a clock implemented in first circuitry is sent from second circuitry. The first circuitry utilizes a first clock signal derived from a first oscillator and the second circuitry utilizes a second clock signal derived from a second oscillator. The first circuitry adjusts a first time value from the clock to compensate for a first latency or jitter caused by converting the first request signal to a second request signal synchronized to the first clock. The second circuitry further adjusts the adjusted first time value to generate a second time value that compensates for i) a second latency between sending the first request signal and receiving the adjusted first time value, and ii) a third latency or jitter caused by synchronizing the adjusted first time value to the second clock.

20 Claims, 8 Drawing Sheets

(56) References Cited

OTHER PUBLICATIONS

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," The Institute of Electrical and Electronics Engineers, Inc., pp. 1-196 (Oct. 2004).

IEEE P1588$^{TM}$ D2.2 "Draft Standard for a Precision Clock Synchronization Protocol for Networked Measurement and Control Systems," The Institute of Electrical and Electronics Engineers, Inc., (2008).

IEEE Std. 1588™—2008 (Revision of IEEE Std. 1588-2002), "IEEE Standard for a Precision Clock Synchronization Protocol for Networked Measurement and Control Systems," The Institute for Electrical and Electronics Engineers, Inc., IEEE Standard, pp. 1-289 (Jul. 24, 2008).

IEEE Std. C37.238$^{TM}$—2011, "IEEE Standard Profile for Use of IEEE 1588$^{TM}$ Precision Time Protocol in Power System Applications," Institute for Electrical and Electronics Engineers, Inc., pp. 1-66 (Jul. 2011).

ITU-T Recommendation G.8265.1/Y.1365.1, "Precision time protocol telecom profile for frequency synchronization," Int'l Telecommunication Union, pp. 1-28 (Oct. 2010).

IEC 62439-3, "Industrial communication networks—High availability automation networks—Part 3: Parallel Redundancy Protocol (PRP) and High-availability Seamless Redundancy (HSR)," International Electrotechnical Commission, pp. 1-62 (2010).

Abdul, et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).

Aldana et al., IEEE P802.11—Wireless LANs, "CIDs 46,47,48 Regarding Fine Timing Measurement," The Institute of Electrical and Electronics Engineers, Inc., doc.: IEEE 802.11 11-12-1249-04-000m, pp. 1-17 (Jan. 2013).

Alizadeh et al., "DCTCP: Efficient packet transport for the commoditized data center," SIGCOMM, pp. 1-15 (2010).

Appenzeller et al., "Sizing router buffers," SIGCOMM, pp. 1-15 (2004).

Chin et al., "IEEE 1588 Clock Synchronization using Dual Slave Clocks in a Slave," IEEE Communications Letters, vol. 13, No. 6, pp. 456-458 (Jun. 2009).

Corlett et al. "Statistics of One-Way Internet Packet Delays", Internet Engineering Task Force, available at http://tools.ietf.org/id/draft-corlett-statistics-of-packet-delays-00.txt- , pp. 1-9 (Aug. 2002).

Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).

Gurewitz et al., "One-Way Delay Estimation Using Network Wide Measurements," IEEE Trans. on Information Theory, vol. 52, No. 6, pp. 2710-2724 (2006).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills et al., "Network Time Protocol Version 4: Protocol and Algorithms Specification," Request for Comments: 5905, Internet Engineering Task Force (IETF), pp. 1-111 (Jun. 2010).

Mills, "Internet Time Synchronization: The Network Time Protocol," Network Working Group Request for Comments, No. 1129, pp. 1-29 (Oct. 1989).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).

Mukherjee, "On the Dynamics and Significance of Low Frequency Components of Internet Load," Internetworking: Research and Experience, vol. 5, No. 4. pp. 163-205 (1992).

Paxson, "End-to-End Internet Packet Dynamics," IEEE/ACM Transactions on Networking, vol. 7(3), pp. 277-292 (Jun. 23, 1997).

Shpiner et al., "Multi-Path Time Synchronization," Internet Engineering Task Force (IETF), Oct. 15, 2012.

Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).

Weber et al., "High availability seamless automation ring (Draft IEC 62439-3) and IEEE 1588 time sync dependencies," Institute for Electrical and Electronics Engineers, Inc, pp. 1-7 (Oct. 2010).

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).

Zhang et al., "PDV-based PTP LSP Setup, Reoptimization and Recovery," Internet Engineering Task Force, pp. 1-17 (Oct. 2011).

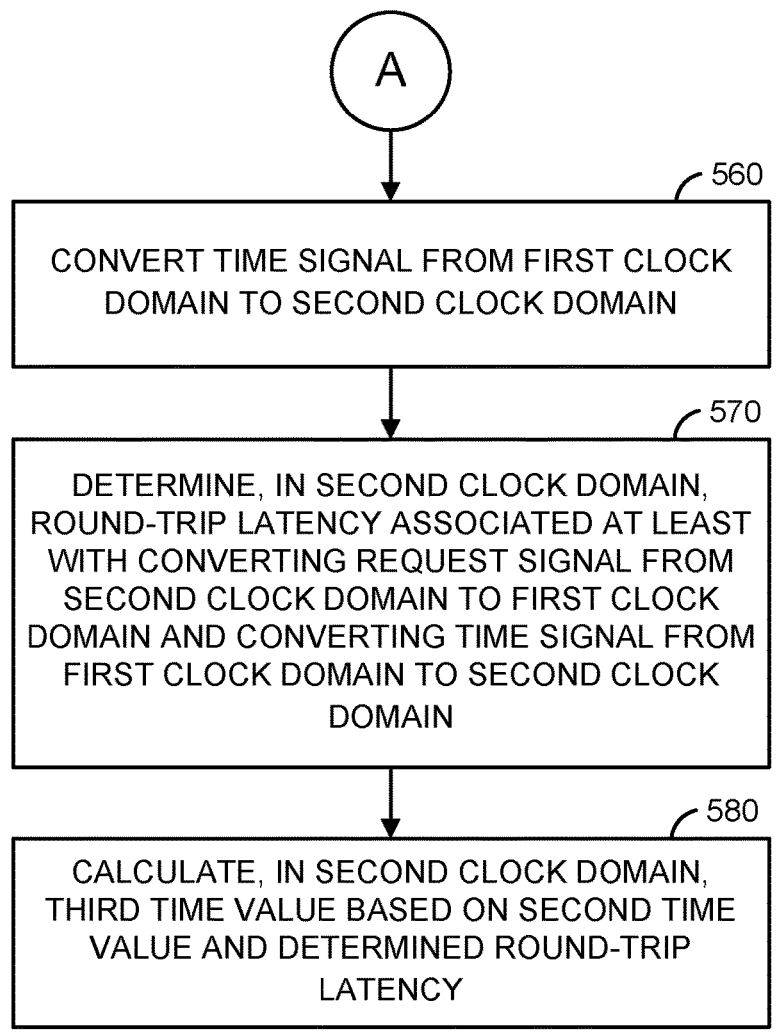

US 10,216,220 B1

ACCURATE TIME CAPTURE AND TRANSFER BETWEEN CLOCK DOMAINS

CROSS-REFERENCE TO RELATED APPLICATION

This application is a continuation of U.S. patent application Ser. No. 13/847,736, entitled "Accurate Time Capture and Transfer Between Clock Domains," filed on Mar. 20, 2013, which claims the benefit of U.S. Provisional Patent Application No. 61/613,842, entitled "Accurate Time Transfer & Time Capture Over VLSI Clock Domain Crossings," filed on Mar. 21, 2012. The disclosures of both of the applications referenced above are hereby incorporated by reference herein in their entireties.

FIELD OF TECHNOLOGY

The present disclosure relates generally to communication networks and, more particularly, to capturing and transferring time between different clock domains in a communication network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication networks typically employ network devices such as bridges and routers to forward information within the network. To efficiently schedule, or otherwise manage, operations within the network, network devices may generate various clock signals. Typically, some of the clock signals within a particular network device are generated independently of each other (e.g., derived from different oscillators) such that they belong to different clock "domains." As a result, clocks within a network device may differ not only by having different frequencies and phases, but also by experiencing drift relative to one another. This lack of synchronization causes uncertainty, or "jitter," in the latencies associated with transactions between the different clock domains. For operations or applications requiring highly accurate and precise time alignment between two different clock domains, the latency and jitter inherent in clock domain crossings can be problematic.

SUMMARY

In an embodiment, a method includes: sending, to first circuitry from second circuitry, a first request signal that indicates a request for a time maintained by a clock implemented in the first circuitry, wherein the first circuitry utilizes a first clock signal derived from a first oscillator and the second circuitry utilizes a second clock signal derived from a second oscillator; adjusting, in the first circuitry, a first time value from the clock to compensate for a first latency or jitter caused by converting the first request signal to a second request signal synchronized to the first clock; sending, from the first circuitry to the second circuitry, the adjusted first time value; further adjusting, in the second circuitry, the adjusted first time value to generate a second time value that compensates for i) a second latency between sending the first request signal and receiving the adjusted first time value, and ii) a third latency or jitter caused by synchronizing the adjusted first time value to the second clock; and providing, with the second circuitry, the second time value to third circuitry that uses the second time value.

In another embodiment, an apparatus comprises first circuitry configured to utilize a first clock signal derived from a first oscillator. The first circuitry includes: a clock that maintains a time, a synchronizer circuit configured to convert a first request signal to a second request signal synchronized to the first clock, wherein the first request signal is received from second circuitry that utilizes a second clock signal derived from a second oscillator, and wherein the first request signal is synchronized to the second clock signal. The first circuitry also includes: a time tracking circuit configured to determine a first time value in response to second request signal, the first time value determined from the clock, and a first adjustment circuit configured to adjust the first time value to generate an adjusted first time value that compensates for a first latency or jitter caused by converting the first request signal to the second request signal synchronized to the first clock. The second circuitry includes: a request generator circuit configured to generate the first request signal, and a second adjustment circuit configured to further adjust the adjusted first time value to generate a second time value that compensates for i) a second latency between sending the first request signal and receiving the adjusted first time value, and ii) a third latency or jitter caused by synchronizing the adjusted first time value to the second clock. The apparatus further comprises third circuitry configured to use the second time value.

In yet another embodiment, a method for obtaining a time maintained in a first clock domain includes generating a request signal in a second clock domain, converting the request signal from the second clock domain to the first clock domain, providing, in the first clock domain, a first time value in response to the converted request signal, calculating, in the first clock domain, a second time value by adjusting the first time value to compensate for a latency associated at least with converting the request signal from the second clock domain to the first clock domain, and generating a time signal in the first clock domain. The time signal is indicative of the second time value. The method also includes converting the time signal from the first clock domain to the second clock domain, determining, in the second clock domain, a round-trip latency associated at least with converting the request signal from the second clock domain to the first clock domain and converting the time signal from the first clock domain to the second clock domain, and calculating, in the second clock domain, a third time value based on the second time value and the determined round-trip latency.

In still another embodiment, an integrated circuit includes at least a first clock domain and a second clock domain. The integrated circuit comprises a time request generator disposed in the second clock domain and configured to generate a request signal, a first synchronizer circuit disposed in the first clock domain and configured to convert the request signal from the second clock domain to the first clock domain, a time tracking circuit disposed in the first clock domain and configured to provide a first time value in response to the converted request signal, a first latency compensator circuit disposed in the first clock domain and configured to calculate a second time value by adjusting the first time value to compensate for a latency associated at least with converting the request signal from the second clock domain to the first clock domain, a time signal generator disposed in the first clock domain and configured to generate a time signal indicative of the second time value, a second synchronizer circuit disposed in the second clock domain and configured to convert the time signal from the first clock domain to the second clock domain, a latency determination circuit disposed in the second clock domain and configured to determine a round-trip latency associated at least with converting the request signal from the second clock domain to the first clock domain and converting the time signal from the first clock domain to the second clock domain, and a second latency compensator circuit disposed in the second clock domain and configured to calculate a third time value based on the second time value and the determined round-trip latency.

BRIEF DESCRIPTION OF THE DRAWINGS

FIGS. 7A and 7B, collectively, are a flow diagram of another example method of obtaining an accurate time across a clock domain boundary, according to an embodiment.

DETAILED DESCRIPTION

Figure 1:
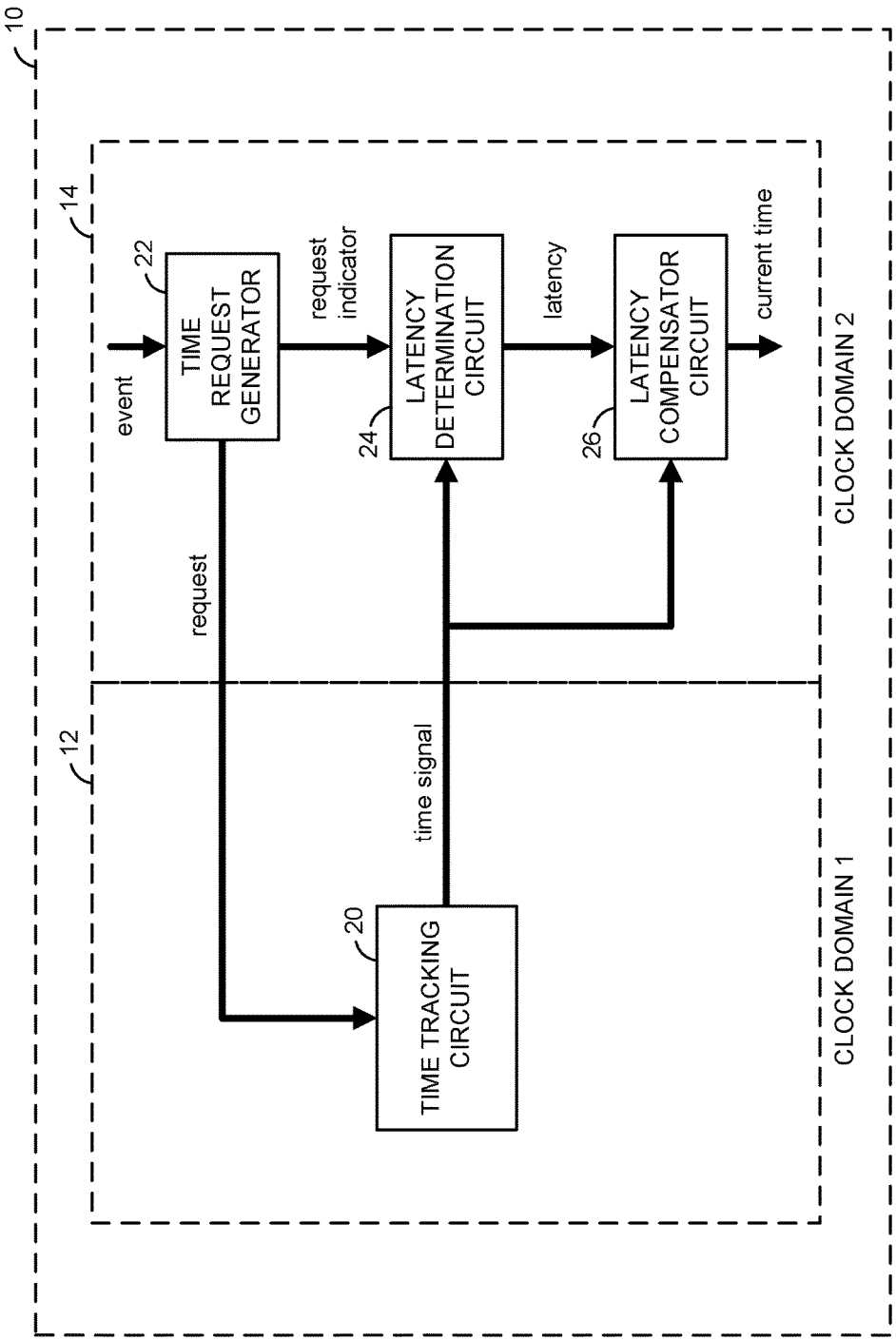
FIG. 1 is a block diagram of an example integrated circuit that utilizes time capture and transfer techniques of the present disclosure, according to an embodiment.

Time synchronization protocols such as Precision Time Protocol (PTP) or Network Time Protocol (NTP) are commonly used to synchronize a "slave" clock at a first node of a communication network to a "master" clock at a different node of the network. For example, various nodes in a network may each locally maintain a time of day, with one node maintaining the master time of day clock to which slave clocks of the other nodes are periodically synchronized. To implement time synchronization protocols such as PTP and NTP, various operations take place at the various nodes. For example, a node maintaining a master clock may be required to generate time protocol packets (or cells, or other types of data units) that must be "time stamped" with the current time of day before being sent to a node maintaining a slave clock. Typically, operations of this sort are performed in circuitry that is clocked at a slower rate than the high-precision time of day clock. As a result, the operations often involve transactions between different clock domains of a network device. Different clock "domains" are generally distinguished by the independence of clock signals within the domains. For example, clock signals in a first clock domain may be derived from a first oscillator, while clock signals in a second domain are derived from a second, different oscillator.

Several timing issues arise when a transaction, such as requesting a time of day (or responding to such a request), occurs across a clock domain boundary. For example, any uncertainty as to the exact time that a time of day request was issued translates to uncertainty, and therefore lower accuracy, in the captured time. Thus, any latency jitter in the path of the request as it crosses the clock domain boundary can degrade the accuracy of the captured time, and therefore degrade the accuracy of the time obtained by the requesting agent. Moreover, in conventional systems, the jitter associated with the path of the response, as it crosses the clock domain boundary in the other direction, can also degrade the accuracy of the time obtained by the requesting agent.

In embodiments described below, circuitry in a second clock domain requests a time (e.g., a time of day) maintained in a first clock domain, and determines a latency associated with receiving the time from the first clock domain. The received time is then adjusted to compensate for the determined latency, in an embodiment. By determining the latency in the second clock domain rather than the first clock domain, the accuracy of the time is unaffected by any jitter in the response path (i.e., in the path of a responsive time signal sent from the first clock domain to the second clock domain), in an embodiment. Jitter in the request path, however, may still decrease the accuracy of the captured time. Thus, in some embodiments described below, a parallel synchronizer design is utilized at the clock domain boundary in the request path to reduce jitter and improve time accuracy as compared to conventional systems.

FIG. 1 is a block diagram of an example integrated circuit 10 that utilizes time capture and transfer techniques of the present disclosure, according to an embodiment. In an embodiment, the integrated circuit 10 is a very-large-scale integration (VLSI) integrated circuit. The integrated circuit 10 includes a first clock domain 12 and a second clock domain 14. In an embodiment, all clocks in the first clock domain 12 are independent of all clocks in the second clock domain 14. In one embodiment, for example, all clocks in the first clock domain 12 are derived from a different oscillator than all clocks in the second clock domain 14. Additionally or alternatively, in an embodiment, all clocks in the first clock domain 12 experience drift with respect to all clocks in the second clock domain 14. The first clock domain 12 also includes circuits that are clocked by one or more clocks of the first clock domain 12, and the second clock domain 14 also includes circuits that are clocked by one or more clocks of the second clock domain 14, in an embodiment.

A time tracking circuit 20 on the integrated circuit 10 is disposed in the first clock domain 12 and maintains a time. In one embodiment, the time maintained by the time tracking circuit 20 is a time of day. In other embodiments, the time maintained by the time tracking circuit 20 is a different time, such as a time relative to some local event, for example. In an embodiment, the time tracking circuit 20 includes a free-running counter (not seen in FIG. 1), and a hardware clock (also not seen in FIG. 1) that updates the counter. In some embodiments, the counter and clock run at a very high frequency, relative to the clock(s) of the second clock domain 14, in order to provide a high level of precision in the tracked time.

A time request generator 22 on the integrated circuit 10 is disposed in the second clock domain 14. The time request generator 22 receives an indication that an event has occurred, and in response generates a request for a current time, in an embodiment. In one embodiment, the indication informs the time request generator 22 that a new time protocol packet has been received, or is being generated, etc., and requires a time stamp. The time request generator 22 also sends the generated request to the time tracking circuit 20, in an embodiment. In some embodiments, the request from the time request generator 22 is converted from the second clock domain 14 to the first clock domain 12 using a synchronization circuit (not seen in FIG. 1). In one embodiment, for example, the request is input to a series of one or more flip-flops (e.g., "D" type flip-flops), where each flip-flop is clocked by a clock of the first clock domain 12. Other embodiments are discussed below with reference to FIGS. 2 and 3.

In some embodiments, the request also passes through additional stages before reaching the time tracking circuit 20, such as one or more shift registers (not seen in FIG. 1). Alternatively, in an embodiment, the time tracking circuit 20 itself includes one or more shift registers that initially receive the request. Once the time tracking circuit 20 receives the request, the time (e.g., time of day) maintained by the time tracking circuit 20 is captured. In an embodiment, a current value of a counter that represents the current time is shifted (copied) to a capture register (not seen in FIG. 1). Moreover, in some embodiments, the time tracking circuit 20 adjusts the shifted time to compensate for known latencies in the request path, causing the captured time to better match the time at which the request was issued by the time request generator 22. In one embodiment where the request path includes a simple synchronizer with two flip-flops in series, for example, the time tracking circuit determines the captured time from the shifted time by subtracting the two cycle delay associated with the two flip-flops, and subtracting any other known delays in the request path (e.g., delays of shift register(s) included in the time tracking circuit 20). Compensation of the time in the first clock domain is discussed in further detail below with reference to the embodiment of FIG. 4.

The time tracking circuit 20 sends a time signal indicating the captured time to the second clock domain 14. In some embodiments, the time signal is converted from the first clock domain 12 to the second clock domain 14 using another synchronization circuit (not seen in FIG. 1), such as a series of one or more flip-flops that are clocked by a clock of the second clock domain 14, for example.

Once latencies in the request path are compensated for, the captured time corresponds to the time that the request was issued by the time request generator 22 (subject to any inaccuracy caused by jitter in the request path). In a conventional system, the time obtained at the second clock domain 14 in response to the request would be subject to further inaccuracy caused by jitter in the path of the responsive time signal. In the embodiment of FIG. 1, however, a latency determination circuit 24 disposed in the second clock domain 14 determines a delay associated with receiving the time signal from the first clock domain 12. In one embodiment, the latency determination circuit 24 determines the delay between issuing the request from the time request generator 22 and receiving the responsive time signal at the latency determination circuit 24. The latency determination circuit 24 measures this delay starting at the time that the time request generator 22 issues the request, in an embodiment. In one embodiment, for example, the latency determination circuit 24 includes a counter (not seen in FIG. 1), clocked by a clock of the second clock domain 14, that is reset when the latency determination circuit 24 receives an indicator that a new request has been sent (or is simultaneously being sent) to the time tracking circuit 20. In one such embodiment, the measured delay corresponds to the counter value when the time signal is received by the latency determination circuit 24 from the first clock domain 12. While FIG. 1 depicts the time tracking circuit 20 sending the time signal to the latency determination circuit 24, in other embodiments the time tracking circuit 20 instead sends a separate indicator to inform the latency determination circuit 24 that the time is ready or available, and the latency determination circuit 24 measures the delay from the time the request is sent by time request generator 22 to the time the indicator is received from the time tracking circuit 20.

The latency determination circuit 24 provides the measured delay/latency to a latency compensator circuit 26 that is also disposed in the second clock domain 14. The latency compensator circuit 26 also receives the time signal indicating the captured time from the time tracking circuit 20, in an embodiment. Based on the measured delay, the latency compensator circuit 26 adjusts the captured time to obtain a current time. In one embodiment, for example, the latency compensator circuit 26 adds the value of a counter in the latency determination circuit 24 to the captured time represented by the time signal from the time tracking circuit 20 in order to obtain the current time.

Figure 2:
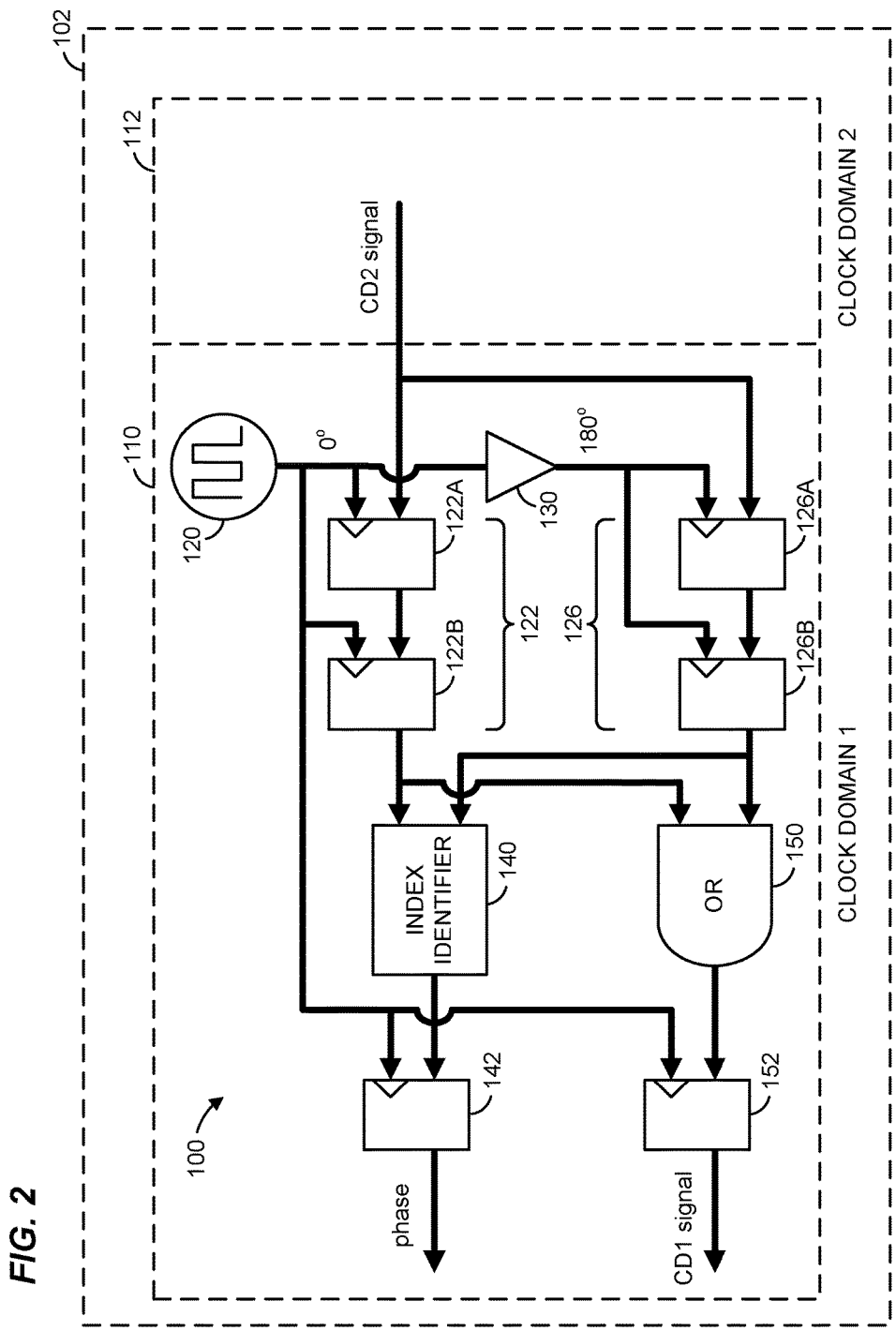
FIG. 2 is a block diagram of an example synchronization circuit, according to an embodiment.

Because the time captured by the time tracking circuit 20 corresponds to the time that the request was issued by the time request generator 22, and because the captured time is adjusted using a latency measured in the second clock domain 14 rather than the first clock domain 12, the compensated, current time provided by the latency compensator circuit 26 is independent of the latency and latency jitter in the path of the time signal from the time tracking circuit 20, in an embodiment. Jitter in the request path, however, may still cause inaccuracies in the captured time, regardless of the compensation performed by the latency compensator circuit 26. In one embodiment, therefore, a synchronization circuit is utilized that exhibits less jitter than conventional designs. FIG. 2 is a block diagram of an example synchronization circuit 100, according to one such embodiment.

The example synchronization circuit 100 resides on an integrated circuit 102, and is disposed in a first clock domain 110. The integrated circuit 102 also includes a second clock domain 112. In an embodiment, the integrated circuit 102 is the same as the integrated circuit 10 of FIG. 1, the first clock domain 110 is the same as the first clock domain 12 of FIG. 1, the second clock domain 112 is the same as the second clock domain 14 of FIG. 1, and the synchronization circuit 100 is included in the request path between the time request generator 22 and the time tracking circuit 20 of FIG. 1.

A clock 120 in the first clock domain 110 is used to clock various portions of the synchronizer circuit 100. The synchronizer circuit 100 receives a signal (e.g., a time request signal) from the second clock domain 112 ("CD2 signal"), and converts the signal to the first clock domain 110 ("CD1 signal"). The CD2 signal is input to two parallel "pipes" of the synchronizer circuit. A first pipe 122 includes two flip-flops 122A and 122B in series, and a second pipe 126 includes two flip-flops 126A and 126B in series. In various alternative embodiments, each of pipes 122 and 126 instead includes only one flip-flop, or includes more than two flip-flops in series. Generally, a larger number of flip-flops in series in each pipe reduces the probability of metastability at the pipe output. Each of the flip-flops in pipe 122 (i.e., flip-flops 122A and 122B) is clocked by the clock 120, and each of the flip-flops in pipe 126 (i.e., flip-flops 126A and 126B) is clocked by a phase-shifted version of the clock 120. The clock 120 is phase shifted by 180 degrees using an inverter 130, in an embodiment. In an embodiment, each of the flip-flops 122A, 122B, 126A and 126B is a "D" type flip-flop, with an output that samples the input of the flip-flop on each rising edge of the clock.

The synchronizer circuit 100 also includes an index identifier circuit 140, which accepts as inputs the output of the first pipe 122 and the second pipe 126. The index identifier circuit 140 determines which pipe first detected the CD2 signal (i.e., whether flip-flop 122B or flip-flop 126B was the first to output a "high" level in response to the CD2 signal going "high"), and outputs a signal indicative of which pipe first detected the CD2 signal. Whether the first pipe 122 or the second pipe 126 first detects the CD2 signal depends on the timing of the CD2 signal relative to both clock 120 and the inverted version of clock 120, as discussed in further detail below with reference to FIG. 3. The signal output from the index identifier circuit 140 is output to another flip-flop 142 (e.g., a "D" type flip-flop) which, on the next rising clock edge of clock 120, outputs a "phase" signal indicative of which pipe first detected the CD2 signal. The "phase" signal output by the flip-flop 142 is used, in some embodiments, to provide an indication of the latency introduced by the synchronization circuit 100, as is also discussed in further detail below with reference to FIG. 3.

The outputs of the first pipe 122 and the second pipe 126 are also provided to an OR gate 150 of the synchronizer circuit 100. The OR gate 150 produces an output that goes "high" when the output of flip-flop 122B or flip-flop 126B goes "high" (whichever occurs first), and the output is coupled to another flip-flop 152 (e.g., a "D" type flip-flop) which, on the next rising edge of clock 120, outputs the CD1 signal (i.e., the CD2 signal converted to the first clock domain).

The operation of the synchronization circuit 100 will now be described with reference to the example timing diagram 160 of FIG. 3. The timing diagram 160 shows two clocks in the first clock domain 110 (CD1 clock 162 and CD1 clock 164), which are offset from each other by 180 degrees and correspond to the clocks used to sample the "CD2 signal" in the pipes 126 and 122, respectively, of FIG. 2. Also shown in timing diagram 160 is a clock in the second clock domain 112 (CD2 clock 166) that corresponds to a clock (not seen in FIG. 2) with which the "CD2 signal" of FIG. 2 is synchronized. The timing diagram 160 also shows a signal (e.g., a request signal) in the second clock domain 112 (CD2 signal 170) that corresponds to the "CD2 signal" of FIG. 2, a signal (e.g., the converted request signal) in the first clock domain 110 (CD1 signal 172) that corresponds to the "CD1 signal" of FIG. 2, and a signal in the first clock domain 110 (phase signal 174) that corresponds to the "phase signal" of FIG. 2.

In the embodiment shown, CD2 signal 170 is aligned with the CD2 clock signal 166 of the second clock domain 112, such that a low-to-high transition 180 of CD2 signal 170 (e.g., indicating a new time request) is generally aligned with a rising edge 182 of CD2 clock 166. Because CD2 clock 166 and CD2 signal 170 reside in a different clock domain than CD1 clocks 162 and 164, a bounded but otherwise unknown phase/time offset ("δ" in FIG. 3) exists between CD2 clock 166 and the next rising edge of a clock in the first clock domain 110. In the example scenario of FIG. 3, CD1 clock 164 has a rising edge 184 that occurs closest to the rising edge 182 of CD2 clock 166, and therefore δ is shown as the time between the rising edge 182 of CD2 clock 166 and the rising edge 184 of CD1 clock 164. In other scenarios, however, the shifted CD1 clock 162 has a rising edge that is closer to the rising edge 182 of CD2 clock 166, and δ is therefore measured between the rising edge 182 and the next rising edge of CD1 clock 162.

As with all flip-flops, each of the flip-flops 122A, 122B, 126A and 126B is associated with a set-up time and a hold time. "Set-up time" refers to the minimum amount of time that an input level of the flip-flop should be held constant before the rising clock edge in order for the output to reliably sample the input. Conversely, "hold time" refers to the minimum amount of time that an input level of the flip-flop should be held constant after the rising clock edge in order for the output to reliably sample the input. Because the offset δ between rising edge 182 of CD2 clock 166 and rising edge 184 of CD1 clock 164 (or, in other scenarios, between rising edge 182 of CD2 clock 166 and the closest subsequent rising edge of shifted CD1 clock 162) is variable, the set-up time constraint may or may not be satisfied for a given scenario. Thus, for the example scenario of FIG. 3, the rising edge 184 of CD1 clock 164 may or may not cause the output of flip-flop 122A to rise, despite occurring after the transition 180 of CD2 signal 170. If the output of flip-flop 122A does rise at edge 184, then the output of flip-flop 122A goes "high" before the output of flip-flop 126A, which in turn causes the output of flip-flop 122B to go "high" (one cycle later) before the output of flip-flop 126B. Conversely, if the output of flip-flop 122A does not rise at edge 184, then the output of flip-flop 126A goes "high" (at edge 186 of shifted CD1 signal 162) before the output of flip-flop 122A, which in turn causes the output of flip-flop 126B to go "high" (one cycle later) before the output of flip-flop 122B. Thus, in the example scenario of FIG. 3, the transition 180 of CD2 signal 170 is "detected" (i.e., causes one of the flip-flops 122A or 122B to change state) either at rising edge 184 or at rising edge 186, corresponding to a time δ or δ+0.5$T_1$, respectively, after the rising edge 182 of CD2 clock 166 (where $T_1$ is the period of shifted CD1 clock 162 and CD1 clock 164). The "high" level output by flip-flop 122A or flip-flop 126A propagates through two additional flip-flops: either flip-flop 122B or flip-flop 126B, as well as flip-flop 152 after the OR gate 150. Therefore, and because flip-flop 152 is clocked by the unshifted CD1 clock 164, the "high" level indicating that transition 180 has been detected propagates to the output of flip-flop 152 at either rising edge 192 of CD1 clock 164 (if the transition 180 was originally detected in pipe 122 at rising edge 184) or rising edge 194 of CD1 clock 164 (if the transition 180 was originally detected in pipe 126 at rising edge 186). Accordingly, as seen in FIG. 3, the CD1 signal 172 transitions to a "high" level at either transition 200 or transition 202. Moreover, phase signal 174 either goes "low" (at transition 210) to reflect that the transition 180 was detected in pipe 122, or goes "high" (at transition 212) to reflect that the transition 180 was detected in pipe 124.

Figure 3:
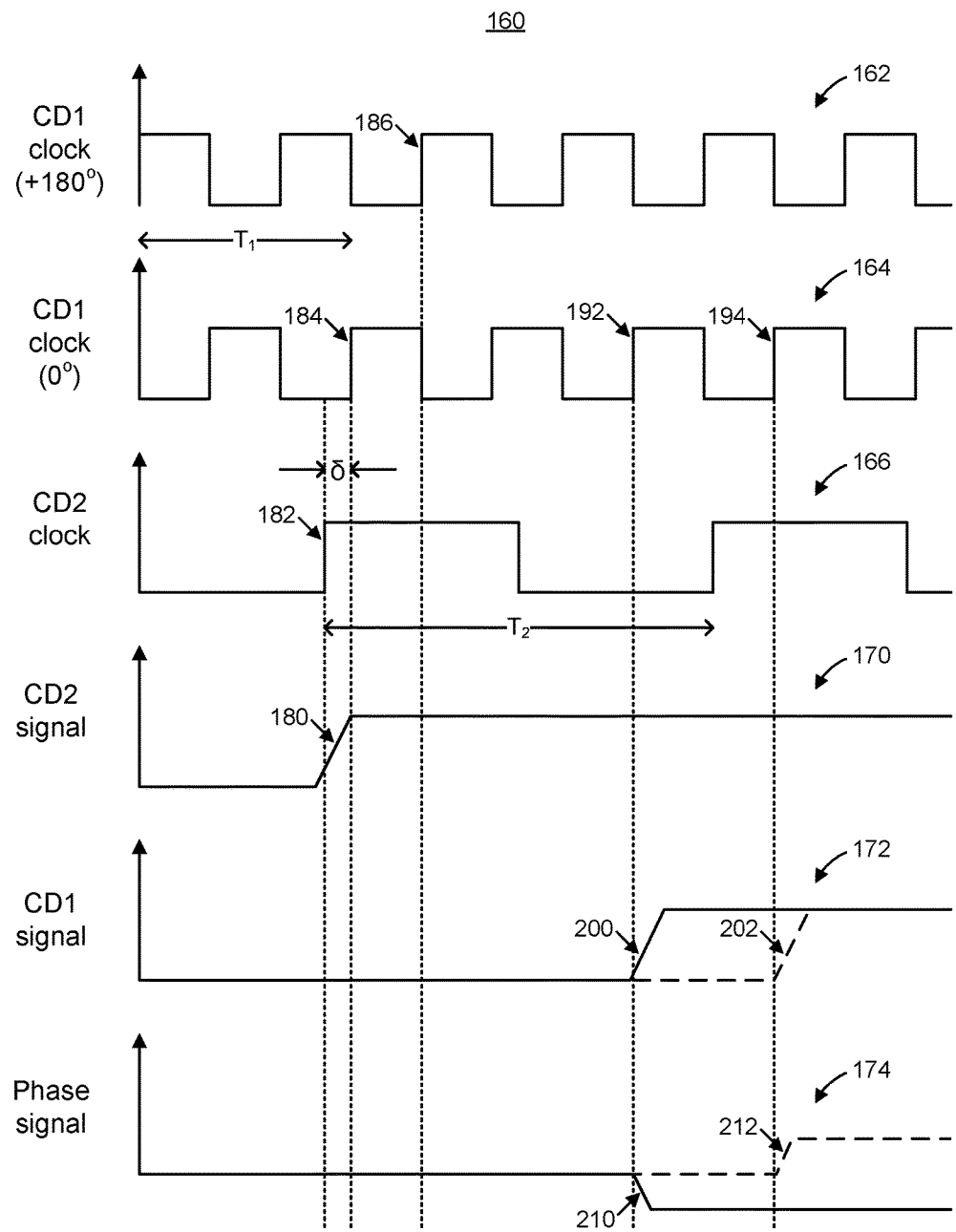
FIG. 3 is an example timing diagram illustrating operation of the example synchronization circuit of FIG. 2, according to an embodiment and scenario.

As seen in FIG. 3, the total latency between the transition 180 of CD2 signal 170 and the transition 200 of CD1 signal 172 is δ+2$T_1$, and the total latency between the transition 180 of CD2 signal 170 and the transition 202 of CD1 signal 172 is δ+3$T_1$. Thus, the conversion of CD2 signal 170 to CD1 signal 172 is associated with a latency between δ+2$T_1$ and δ+3$T_1$, with a latency "jitter" of $T_1$ (i.e., one cycle of CD1 clock 164). In some embodiments, however, phase signal 174 is utilized to reduce the effective amount of jitter. In one embodiment where the CD2 signal 170 is a time request from the time request generator 22 of FIG. 1, for example, the time tracking circuit 20 compensates the time by subtracting 2$T_1$ (plus any additional known latency in the request path) if the phase signal 174 is "low," and subtracts 3$T_1$ (plus any additional known latency in the request path) if the phase signal 174 is "high." In this manner, the effective jitter is reduced from $T_1$ to 0.5$T_1$.

While FIGS. 2 and 3 relate to an embodiment in which the synchronizer circuit 100 includes only two parallel pipes 122, 126, other embodiments include three or more parallel pipes, each with one or more flip-flops in series. In such an embodiment, additional phase-shifted versions of the clock 120 are generated, with a different phase shift being applied to the clock of each pipe. In one embodiment with n pipes, for example, the clock signals used by the n pipes are shifted by $T_1/n$. For n=4, for example, the flip-flops of a first pipe are clocked with clock 120 of FIG. 2 (i.e., CD1 clock 164 of FIG. 3), the flip-flops of a second pipe are clocked with a 90 degree shifted version of clock 120, the flip-flops of a third pipe are clocked with a 180 degree shifted version of clock 120, and the flip-flops of a fourth pipe are clocked with a 270 degree shifted version of clock 120. Generally, increasing the number of pipes n in this manner increases the timing accuracy by reducing the jitter to $T_1/n$.

In some embodiments with n≥2 pipes, both the OR gate 150 and the index identifier circuit 140 accept n inputs (one from each pipe output). When the OR gate 150 (or another OR gate within the index identifier circuit 140) transitions from "low" to "high," the output of the index identifier circuit 140 transitions to the index (between 0 and n−1) of the pipe that first detected the transition 180 of CD2 signal 170, in an embodiment. In one embodiment, the index identifier circuit 140 outputs the index value j when determining that a pipe clocked with phase shift j*360/n was the first to detect the transition 180 of CD2 signal 170 in FIG. 3. In an embodiment, the output of the index identifier circuit 140 is then kept steady until the next transition of the output of OR gate 150 (or other OR gate in index identifier circuit 140) from "low" to "high."

Moreover, while FIGS. 2 and 3 have been described with reference to an embodiment in which the transition 180 of CD2 signal 170 is "low" to "high" (e.g., to reflect a time request), in other embodiments the transition 180 is instead "high" to "low," with the index identifier circuit 140 of FIG. 2 determining whether the output of pipe 122 or pipe 126 was the first to transition to a "low" level, and with the OR gate 150 being replaced by a NAND gate.

Figure 4:
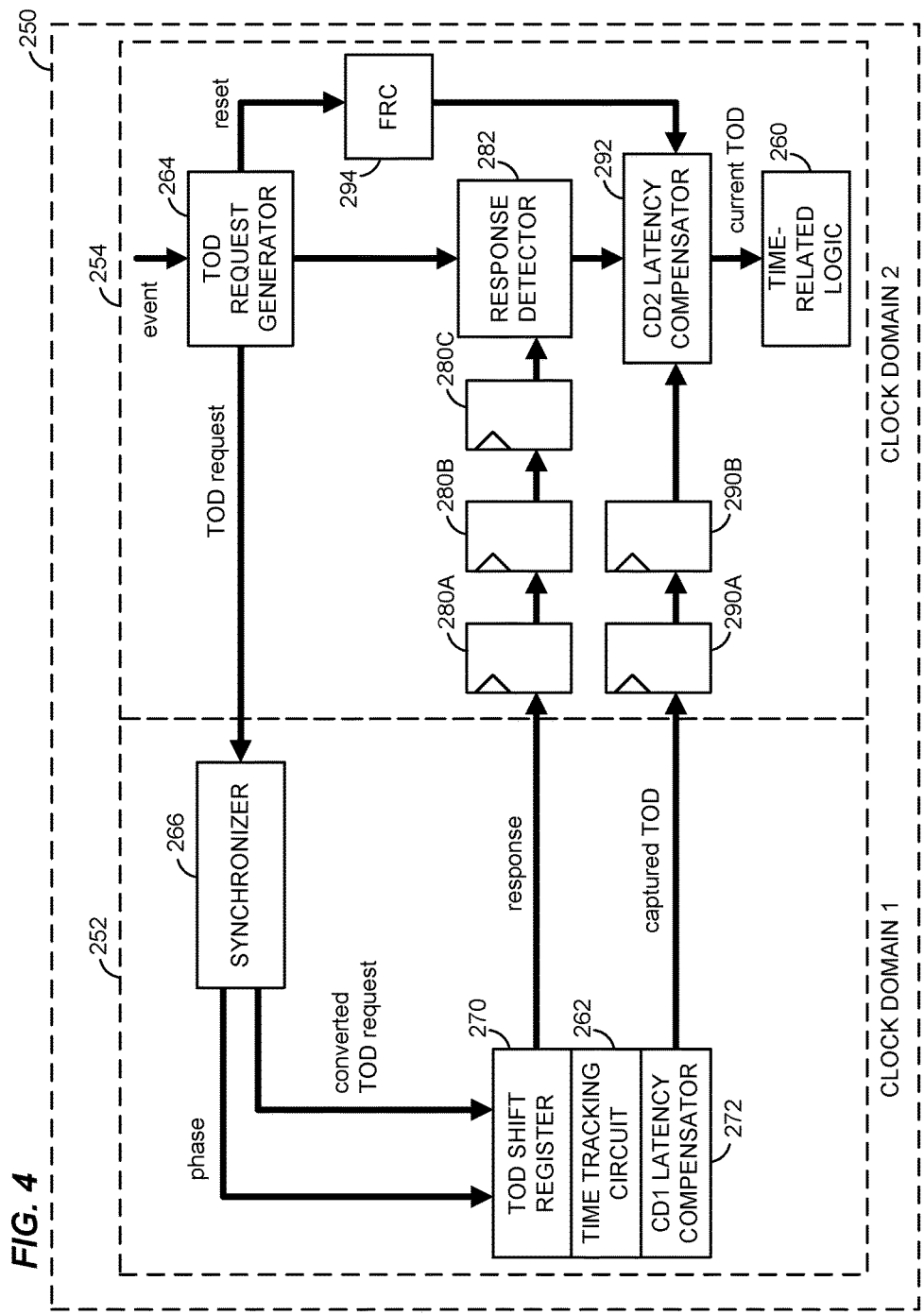
FIG. 4 is a block diagram of another example integrated circuit that utilizes time capture and transfer techniques of the present disclosure, according to an embodiment.

FIG. 4 is a block diagram of an example integrated circuit 250 that utilizes both the time capture techniques of the synchronizer circuit 100 of FIG. 2 and the time transfer techniques of the integrated circuit 10 of FIG. 1, according to an embodiment. The integrated circuit 250 includes a first clock domain 252 and a second clock domain 254. In an embodiment, the first clock domain 252 and second clock domain 254 are similar to the first clock domain 12 and second clock domain 14, respectively, of FIG. 1. The first clock domain 252 includes a time tracking circuit 262 that maintains a time of day ("TOD"). In other embodiments, however, the time tracking circuit 262 maintains a time other than the TOD. In an embodiment, the time tracking circuit 262 maintains the TOD as the value of a free-running counter (not seen in FIG. 4) that is updated by a hardware clock (also not seen in FIG. 4).

A TOD request generator 264 in the second clock domain 254 generates a "TOD request" in response to receiving an event indicator, in an embodiment. In one embodiment, the event is the identification of a time protocol packet that requires a TOD time stamp. In other embodiments, the event is the identification of a time protocol packet that requires a different, non-TOD time stamp (e.g., a time stamp representing a time elapsed since another, earlier event). The TOD request generator 264 also sends the generated TOD request to the time tracking circuit 262, in an embodiment.

Before the TOD request arrives at the time tracking circuit 262, the TOD request is converted from the second clock domain 254 to the first clock domain 252 by a synchronizer circuit 266. In an embodiment, the synchronizer circuit 266 is the same as or similar to the synchronizer circuit 100 of FIG. 2, and operates in a manner the same as or similar to that shown in the example scenario of FIG. 3. Thus, the synchronizer circuit 266 outputs the converted TOD request signal as well as a phase signal indicating which pipe within the synchronizer (e.g., pipe 122 or pipe 126 of FIG. 2, for an embodiment where n=2) first detected the TOD request. In an alternative embodiment, the synchronizer 266 includes only a single pipe, and does not output a phase signal.

A TOD shift register 270 in the first clock domain 252 receives the converted TOD request and the phase signal from the synchronizer 266, causing a current value of the TOD maintained by the time tracking circuit 262 to be shifted/copied to a capture register (not seen in FIG. 4), in an embodiment. A latency compensator circuit 272 in the first clock domain 252 then adjusts the value of the TOD shifted to the capture register to determine a "captured TOD," in an embodiment. In one embodiment, the captured TOD is determined based on the time value shifted to the capture register and the value of the phase signal received from the synchronizer circuit 266. In one embodiment, for example, the latency compensator circuit 272 determines the captured TOD according to the equation:

$$TOD_{captured} = TOD_{shifted} - (m+1)*T_1 - phase*(T_1/n), \quad \text{(Equation 1)}$$

where $TOD_{shifted}$ is the value of the TOD that was shifted to the capture register, in is the number of stages (series flip-flops) in the synchronizer circuit 266, $T_1$ is the period of the clock in the first clock domain 252 that is used to clock the flip-flops of the synchronizer circuit 266, and n is the number of parallel pipes in the synchronizer circuit 266. The quantity "phase" in Equation 1 is an integer j, where the pipe clocked with a phase shift j*360/n was the first pipe to detect the TOD request. For example, in one embodiment and scenario where the synchronizer circuit 266 has four parallel pipes (n=4), and where the TOD request was first detected by a pipe clocked with a 270 degree phase shift, j is equal to 3 (i.e., 270=3*360/4). The quantity (m+1) in Equation 1 reflects the in flip-flop stages of the synchronizer circuit 266, plus the TOD shift register 270.

In other embodiments, the latency compensator circuit 272 compensates for additional stages (e.g., shift registers) not seen in FIG. 4. Moreover, in one embodiment where the synchronizer circuit 266 includes only a single pipe and does not output a phase signal, Equation 1 reduces to:

$$TOD_{captured} = TOD_{shifted} - (m+1)*T_1 \quad \text{(Equation 2)}$$

In an embodiment, the latency compensator circuit 272 sends the compensated, "captured" TOD to a series of flip-flops 290A and 290B. Flip-flops 290A and 290B are clocked by a clock residing in the second clock domain 254, and act as a second synchronizer circuit to convert the captured TOD from the first clock domain 252 to the second clock domain 254. In various alternative embodiments, flip-flop 290B is not included in integrated circuit 250, or one or more additional, series flip-flops are coupled to the output of flip-flop 290B. Because the embodiment of FIG. 4 does not utilize a parallel pipe synchronizer circuit for the conversion to the second clock domain 254, the flip-flops 290A and 290B introduce a latency jitter that is equal to one cycle of the clock in the second clock domain 254 that is used to clock flip-flops 290A and 290B.

The flip-flop 290B provides the converted, captured TOD to a latency compensator circuit 292 in the second clock domain 254. The latency compensator circuit 292 adjusts the captured TOD to compensate for a latency determined in the second clock domain 254. In particular, the latency compensator circuit 292 adjusts the captured TOD to compensate for the delay between issuing the TOD request and receiving the captured TOD, in an embodiment. To measure this delay, the TOD request generator 264 sends a reset signal to a free-running counter (FRC) 294 in the second clock domain 254 in response to receiving the event indicator, in an embodiment. Thus, in this embodiment, the FRC 294 starts its count when the TOD request is sent to the synchronizer 266 of the first clock domain 252. To determine when to read the value of the FRC 294, the latency compensator circuit 292 waits for an indication from a response detector 282 in the second clock domain 254, in an embodiment. Either the TOD shift register 270, the time tracking circuit 262, or the latency compensator circuit 272 sends a "response" indicator to the response detector 282 when the captured TOD is ready, in various embodiments. Like the captured TOD, the response indicator is converted from the first clock domain 252 to the second clock domain 254. In the embodiment of FIG. 4, however, the response is sampled by an additional flip-flop 280C, which allows one clock cycle of "guard time" for the captured TOD to stabilize before it is utilized by the latency compensator circuit 292. In alternative embodiments, the response is sampled only with flip-flop 280A, only with flip-flops 280A and 280B, or with one or more series flip-flops in addition to flip-flops 280A through 280C.

After receiving the sampled response signal from flip-flop 280C, the response detector 282 sends an indicator to the latency compensator circuit 292 signaling that the captured TOD is ready, in an embodiment. In response to receiving the indicator from response detector 282, in an embodiment, the latency compensator circuit 292 reads both the captured TOD and the current value of the FRC 294. In one embodiment, the latency compensator circuit 292 calculates a current time of day according to the equation:

$$TOD_{current} = TOD_{captured} + FRC*T_2, \quad \text{(Equation 3)}$$

where $T_2$ is the period of the clock in the second clock domain 254 that is used to clock the flip-flops 280A through 280C, 290A and 290B, and FRC is the current integer value of FRC 294 as read by latency compensator circuit 292 (for embodiments in which FRC 294 increments by one for each cycle of the clock in the second clock domain 254).

By determining the request/response delay (i.e., the latency between issuing the TOD request and receiving the captured TOD) locally within the second clock domain 254, the architecture of the integrated circuit 250 is able to provide a TOD maintained in the first clock domain 252 to time-related logic 260 in the second clock domain 250 without suffering inaccuracies due to jitter in the response/TOD path. This may be particularly advantageous where the clock of the second clock domain 254 is much slower than the clock of the first clock domain 252, because latency jitter is generally proportional to the period of the clock in the destination clock domain.

After determining the compensated TOD, latency compensator circuit 292 provides the compensated TOD to the time-related logic 260 located on the integrated circuit 250, in an embodiment. The time-related logic 260 is any logic, circuit or node that can utilize the compensated TOD provided by latency compensator circuit 292. In one embodiment, for example, the time-related logic 260 "time stamps" a time protocol packet with the compensated TOD.

In various alternative embodiments, the integrated circuit 250 includes a different arrangement or combination of circuitry and/or signals. As noted above, for example, the synchronizer circuit 266 is a single-pipe circuit that does not output a "phase" signal, in some embodiments. As another example, in an embodiment, the captured TOD signal itself serves as an indicator that the captured TOD is ready. In one such embodiment, the "response" indicator signal and flip-flops 280A through 280C are omitted from integrated circuit 250, and the response detector 282 is omitted or included in the latency compensator circuit 292.

Figure 5:
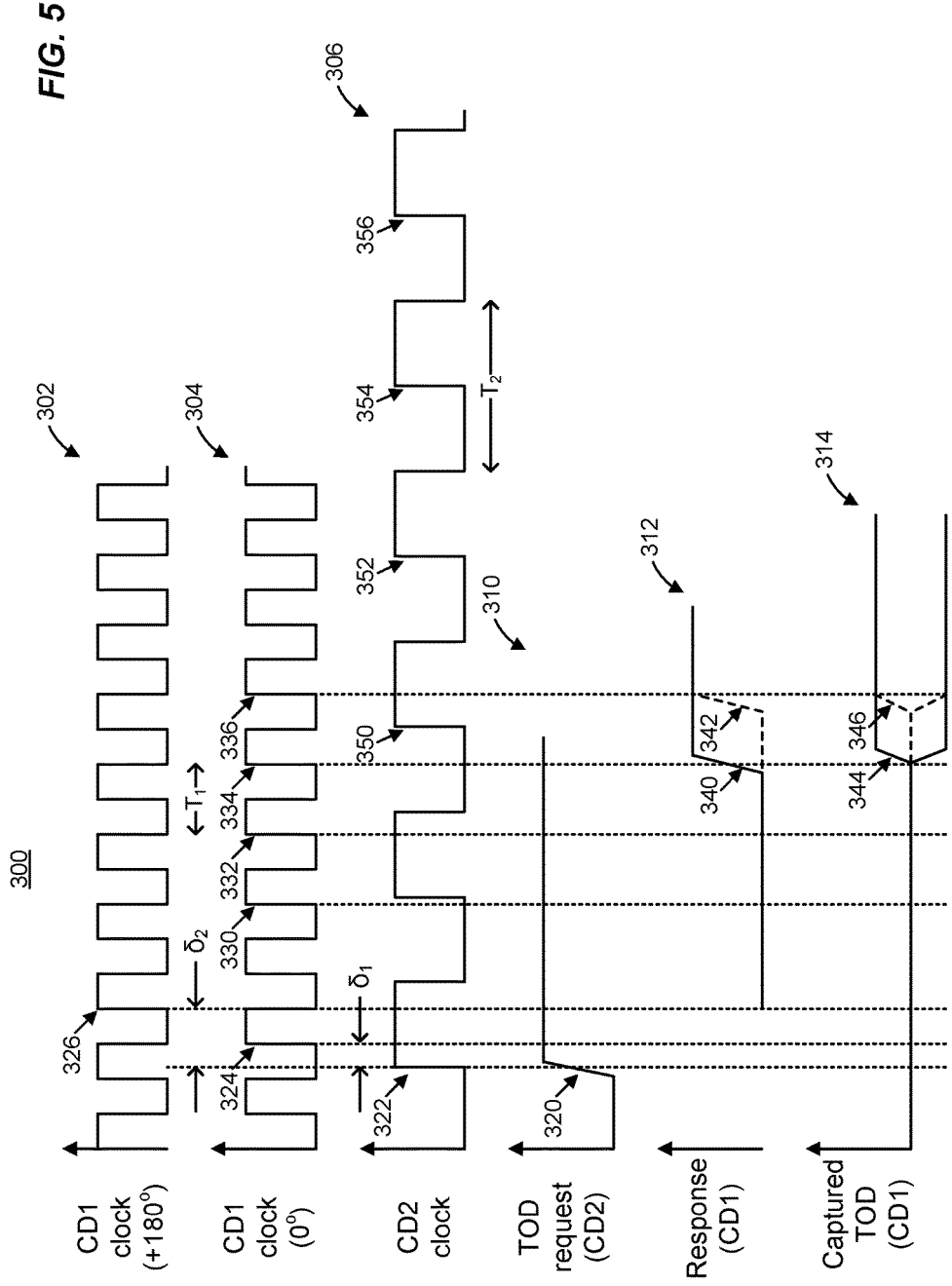
FIG. 5 is an example timing diagram illustrating operation of the example integrated circuit of FIG. 4, according to an embodiment and scenario.

FIG. 5 is an example timing diagram 300 illustrating operation of the example integrated circuit 250 of FIG. 4, according to an embodiment and scenario. The timing diagram 300 corresponds to an embodiment in which the synchronizer circuit 266 is arranged in a manner the same as or similar to the synchronizer circuit 100 of FIG. 2, with two parallel pipes clocked by 0 degree and 180 degree clock signals, respectively. Thus, the timing diagram 266 is similar in many respects to the timing diagram 160 of FIG. 3.

The timing diagram 300 shows two clocks in the first clock domain 252 (CD1 clock 302 and CD1 clock 304), which are offset from each other by 180 degrees and correspond to the clocks used to sample the "TOD request" signal in first and second pipes, respectively, of the synchronizer circuit 266 of FIG. 4. Also shown in timing diagram 300 is a clock in the second clock domain 254 (CD2 clock 306) that corresponds to the clock used to sample the "response" and "captured TOD" signals (using flip-flops 280A through 280C and 290A through 290B, respectively) of FIG. 4. The timing diagram 300 also shows a signal in the second clock domain 254 (TOD request signal 310) that corresponds to the "TOD request" of FIG. 4, a signal in the first clock domain 252 (response signal 312) that corresponds to the "response" signal of FIG. 4, and a signal in the first clock domain 252 (captured TOD signal 314) that corresponds to the "captured TOD" signal of FIG. 4.

Similar to the timing diagram 160 of FIG. 3, a transition 320 corresponding to TOD request 310 generally aligns with a rising edge 322 of CD2 clock 306, and is detected either by rising edge 324 of CD1 clock 304 or rising edge 326 of the 180 degree shifted CD1 clock 302. The quantity "$\delta_1$" in FIG. 5 corresponds to the time between the rising edge 322 of CD2 clock 306 and the closest subsequent rising edge 324 of CD1 clock 304, and the quantity "$\delta_2$" in FIG. 5 corresponds to the time between the rising edge 322 of CD2 clock 306 and the closest subsequent rising edge 326 of the 180 degree shifted CD1 clock 302.

In an embodiment, if the transition 320 of TOD request signal 310 is first detected by the pipe of synchronizer circuit 266 that is clocked by CD1 clock 304, the transition 320 of TOD request signal 310 reaches the output of the synchronizer circuit 266 at rising edge 330 of CD1 clock 304. Later, at rising edge 332, the transition 320 of TOD request signal 310 reaches the TOD shift register 270 and causes the TOD to be shifted to the capture register. Next, at rising edge 334, the response signal 312 and captured TOD signal 314 are sent back to the second clock domain 254 (depicted in FIG. 5 as transitions 340 and 344, respectively). The transition 340 of response signal 312 is then detected by flip-flop 280A at rising edge 350 of CD2 clock 306, and reaches the output of flip-flop 280C at rising edge 354.

Conversely, in an embodiment, if the transition 320 of TOD request signal 310 is first detected by the pipe of synchronizer circuit 266 that is clocked by the 180 degree shifted CD1 clock 302, the transition 320 of TOD request signal 310 reaches the output of the synchronizer circuit 266 at rising edge 332 of CD1 clock 304. Later, at rising edge 334, the transition 320 of TOD request signal 310 reaches the TOD shift register 270 and causes the TOD to be shifted to the capture register. Next, at rising edge 336, the response signal 312 and captured TOD signal 314 are sent back to the second clock domain 254 (depicted in FIG. 5 as transitions 342 and 346, respectively). The transition 342 of response signal 312 is then detected by flip-flop 280A at rising edge 352 of CD2 clock 306, and reaches the output of flip-flop 280C at rising edge 356.

When the transition 344 or 346 of the captured TOD signal 314 reaches the latency compensator circuit 292, the TOD is adjusted according to Equation 3 above, in an embodiment. Thereafter, depending on which pipe of synchronizer circuit 266 first detects the transition 320 of TOD request signal 310, the time error/inaccuracy in the time provided to the time-related logic 260 of FIG. 4 is either $\delta_1$ or $\delta_2$ (with $\delta_2$ being equal to $\delta_1+0.5T_1$), irrespective of the amount of jitter in the response path, and irrespective of any offset $\delta$ between the transition 340 or 342 of the response signal 312 and the next rising edge of CD2 clock 306.

Figure 6:
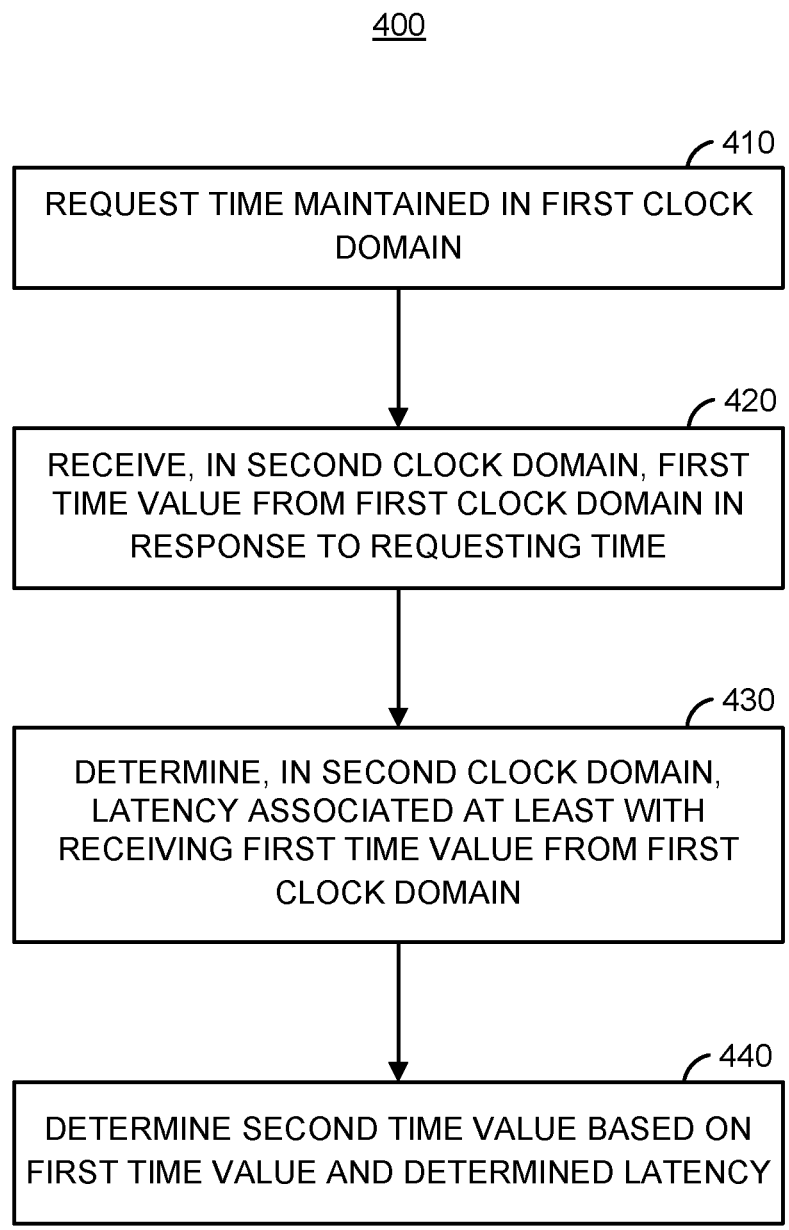
FIG. 6 is a flow diagram of an example method of obtaining an accurate time across a clock domain boundary, according to an embodiment.

FIG. 6 is a flow diagram of an example method 400 of obtaining an accurate time across a boundary between a first clock domain and a second clock domain, according to an embodiment. The first clock domain and second clock domain are similar to the first clock domain 12 and second clock domain 14 described above with reference to FIG. 1, in an embodiment.

At block 410, a time maintained in the first clock domain (such as a time of day, for example) is requested. In one embodiment, the time is maintained in the first clock domain by updating a free-running counter with a hardware clock of the first clock domain. Moreover, in some embodiments, the hardware clock runs at a very high frequency (e.g., relative to any clocks of the second clock domain) in order to maintain the time with a high level of precision.

In an embodiment, requesting the time at block 410 includes generating a request signal in the second clock domain (e.g., the "request" signal of FIG. 1 or the "TOD request" signal of FIG. 4), and the method 400 additionally includes a block (not seen in FIG. 6) in which the request signal is converted from the second clock domain to the first clock domain. In one such embodiment, the conversion is performed by a synchronization circuit such as synchronization circuit 100 of FIG. 2 or synchronization circuit 266 of FIG. 4, for example. In one embodiment, the conversion includes providing a first output (e.g., the output of flip-flop 122B in FIG. 2) indicating whether the request signal has been detected by a first circuit (e.g., pipe 122 of FIG. 2), where the first circuit is clocked using a first clock in the first clock domain, and providing a second output (e.g., the output of flip-flop 126B in FIG. 2) indicating whether the request signal has been detected by a second circuit (e.g., pipe 126 of FIG. 2), where the second circuit is clocked using a second clock in the first clock domain that is phase-shifted (e.g., by 180 degrees) relative to the first clock. In one such embodiment, the conversion also includes providing a third output (e.g., the output of index identifier circuit 140 in FIG. 2) indicating whether the first circuit or the second circuit detected the request signal first.

At block 420, a first time value is received in the second clock domain from the first clock domain in response to requesting the time at block 410. In an embodiment, the first time value is indicated by a time signal that is generated in the first clock domain in response to the request, and then converted to the second clock domain using a synchronization circuit such as flip-flops 290A and 290B of FIG. 4, for example. Moreover, in an embodiment, the first time value is a time that was already adjusted in the first clock domain to compensate for a known latency in the request path (e.g., according to Equation 1 or Equation 2 above, in an embodiment).

At block 430, a latency is determined in the second clock domain. The latency is a delay associated at least with receiving the first time value from the first clock domain. In some embodiments, the latency determined at block 430 is a "round-trip" latency associated at least with requesting the time at block 410 and receiving the first time value at block 420. In one embodiment, for example, the latency is the delay between issuing a request at block 410 and receiving the first time value at block 420.

In some embodiments, a counter in the second clock domain is used to determine the latency at block 430. In one embodiment, for example, the method 400 includes detecting an event (in a block not seen in FIG. 6), requesting the time (at block 410) in response to detecting the event, resetting the counter (at block 430) in response to detecting the event, and reading the value of the counter (also at block 430) in response to receiving from the first clock domain either the first time value or an indicator that the first time value is available (e.g., an indicator similar to the "response" signal of FIG. 4). In various embodiments, the detected "event" is any event for which a current time is desired, such as identifying a time protocol packet to be time stamped, for example.

At block 440, a second time value is determined based on the first time value received at block 420 and the latency determined at block 430. In an embodiment, the second time value is determined in the second clock domain. In one embodiment where the latency is determined at block 430 using a counter, the second time value is determined at block 440 at least in part by adding the value of the counter read at block 430 to the first time value received at block 420 (e.g., according to Equation 3 above, in an embodiment).

Figure 7A:
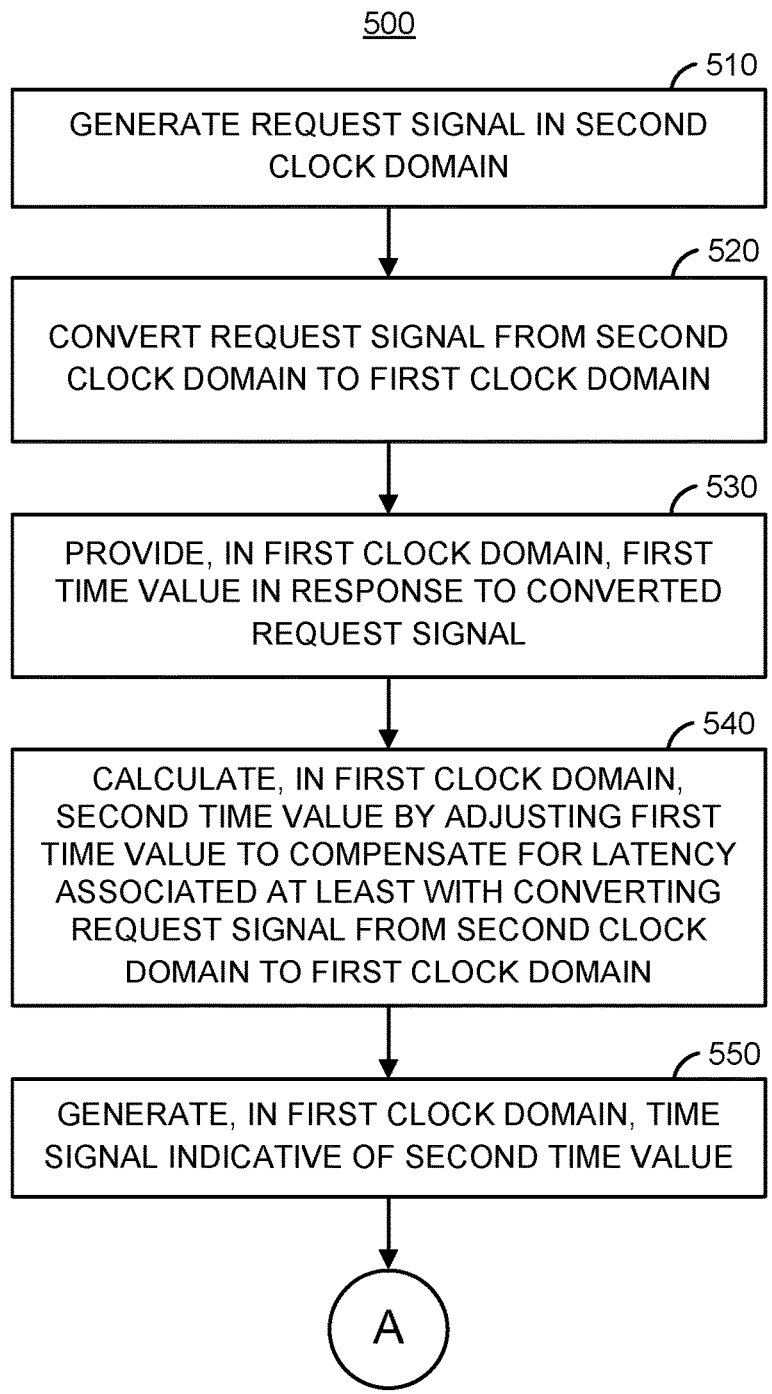

FIGS. 7A and 7B, collectively, are a flow diagram of a more detailed example method 500 for obtaining an accurate time across a boundary between a first clock domain and a second clock domain, according to an embodiment. The first clock domain and second clock domain are similar to the first clock domain 12 and second clock domain 14 described above with reference to FIG. 1, in an embodiment.

Referring first to FIG. 7A, at block 510, a request signal is generated in the second clock domain. The generated request is a request for a time, such as a time of day, maintained in the first clock domain. In an embodiment, the request is generated at block 510 in response to detecting an event, as discussed above with reference to the method 400 of FIG. 6.

At block 520, the request signal generated at block 510 is converted from the second clock domain to the first clock domain. The conversion at block 520 is performed by a synchronization circuit such as synchronization circuit 100 of FIG. 2 or synchronization circuit 266 of FIG. 4, in an embodiment.

At block 530, a first time value is provided in the first clock domain in response to the request signal converted at block 520. In an embodiment, the first time value is the time shifted to a capture register when the request signal reaches a shift register in the first clock domain (e.g., when the request reaches TOD shift register 270 of FIG. 4, in an embodiment).

At block 540, a second time value is calculated in the first clock domain by adjusting the first time value (provided at block 530) to compensate for a latency associated at least with converting (at block 520) the request signal from the second clock domain to the first clock domain. In one embodiment where converting the request signal at block 520 includes processing the request signal using a set of one or more flip-flop circuits (e.g., as in the synchronizer 100 of FIG. 2, or using a single-pipe synchronizer, etc.), the calculation at block 540 includes adjusting the first time value to compensate for a latency associated with the flip-flop circuits. In one embodiment, for example, the second time value is calculated according to Equation 1 or Equation 2, above.

At block 550, a time signal indicative of the second time value calculated at block 540 is generated in the first clock domain. In an embodiment, a separate indicator that the time signal is available (e.g., the "response" signal of FIG. 4) is also generated at block 550.

Referring now to FIG. 7B, at block 560, the time signal generated at block 550 is converted from the first clock domain to the second clock domain. In an embodiment, the time signal is converted using a series of one or more flip-flops. In an embodiment where a separate indicator signal is also generated at block 550, the indicator signal is also converted from the first clock domain to the second clock domain at block 560 (e.g., using a separate series of one or more flip-flops).

At block 570, a round-trip latency is determined in the second clock domain. The round-trip latency is a delay associated at least with converting (at block 520) the request signal from the second clock domain to the first clock domain and converting (at block 560) the time signal from the first clock domain to the second clock domain. In one embodiment, the round-trip latency determined at block 570 is a delay that is also associated with one or more shift registers in the first clock domain (e.g., TOD shift register 270 of FIG. 4). In one embodiment where the request is generated at block 510 in response to detecting an event, the round-trip latency is determined at block 570 at least in part by resetting a counter disposed in the second clock domain in response to detecting the event, and then reading the value of the counter in response to receiving, from the first clock domain, the converted time signal and/or receiving an indicator that the converted time signal is available.

At block 580, a third time value is calculated in the second clock domain based on both the second time value calculated at block 540 and the round-trip latency determined at block 570. In an embodiment, the third time value is calculated according to Equation 3, above.

In some embodiments, at least portions of the techniques described above are implemented in hardware. In some embodiments, for example, the method 400 or the method 500 is implemented entirely by various portions of a single integrated circuit of a network device, such as integrated circuit 10 of FIG. 1 or integrated circuit 250 of FIG. 2. Moreover, in some embodiments, integrated circuit 10 of FIG. 1, integrated circuit 102 of FIG. 2, or integrated circuit 250 of FIG. 4 is a custom integrated circuit, an application specific integrated circuit (ASIC), a programmable logic device (PLD), a field programmable logic array (FPGA), a programmable logic array (PLA), etc.

Embodiments of the present disclosure may be embodied in any type of network device used in a wired or wireless communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
  sending, to first circuitry from second circuitry, a first request signal that indicates a request for a time maintained by a clock implemented in the first circuitry, wherein the first circuitry utilizes a first clock signal derived from a first oscillator and the second circuitry utilizes a second clock signal derived from a second oscillator;
  adjusting, in the first circuitry, a first time value from the clock to compensate for a first latency or jitter caused by converting the first request signal to a second request signal synchronized to the first clock;
  sending, from the first circuitry to the second circuitry, the adjusted first time value;
  further adjusting, in the second circuitry, the adjusted first time value to generate a second time value that compensates for i) a second latency between sending the first request signal and receiving the adjusted first time value, and ii) a third latency or jitter caused by synchronizing the adjusted first time value to the second clock; and
  providing, with the second circuitry, the second time value to third circuitry that uses the second time value.

2. The method of claim 1, wherein converting the first request signal to the second request signal includes:
  providing the first request signal to a first pipe circuit of the first circuitry, wherein the first pipe circuit is clocked with the first clock; and
  providing the first request signal to one or more second pipe circuits of the first circuitry, wherein the one or more second pipe circuits are clocked with one or more respective third clocks derived from the first oscillator, and wherein the one or more respective third clocks are respectively phase shifted versions of the first clock.

3. The method of claim 2, wherein:
  providing the first request signal to the first pipe circuit includes providing the first request signal to a first set of flip-flops coupled together in series; and
  providing the first request signal to the one or more second pipe circuits includes providing the first request signal to one or more second sets of flip-flops, each second set of flip-flops coupled together in series.

4. The method of claim 2, wherein adjusting the first time value to compensate for the first latency or jitter includes:
  generating, with the first circuitry, an output signal that indicates which of the first pipe circuit and the one or more second pipe circuits first detected the first request signal.

5. The method of claim 2, wherein further adjusting the adjusted first time value to generate the second time value includes determining, with the second circuitry, a value of a counter clocked by the second clock.

6. The method of claim 5, further comprising:
  resetting, with the second circuitry, the counter when sending the first request signal to the first circuitry.

7. The method of claim 6, wherein further adjusting the adjusted first time value includes using the value of the counter to further adjust the adjusted first time value.

8. The method of claim 1, further comprising:
sending, from the first circuitry to the second circuitry, a response signal that indicates the first circuitry is providing the adjusted first time value to the second circuitry.

9. The method of claim 8, further comprising:
detecting, with the second circuitry, the response signal;
wherein further adjusting the adjusted first time value to generate the second time value includes, in response to detecting the response signal, determining, with the second circuitry, a value of a counter clocked by the second clock; and
wherein further adjusting the adjusted first time value to generate the second time value includes using the value of the counter to further adjust the adjusted first time value.

10. The method of claim 1, further comprising:
generating, with the third circuitry, a time stamp using the second time value, wherein the time stamp corresponds to a packet being forwarded or transmitted or received.

11. An apparatus, comprising:
first circuitry configured to utilize a first clock signal derived from a first oscillator, wherein the first circuitry includes:
  a clock that maintains a time,
  a synchronizer circuit configured to convert a first request signal to a second request signal synchronized to the first clock, wherein the first request signal is received from second circuitry that utilizes a second clock signal derived from a second oscillator, and wherein the first request signal is synchronized to the second clock signal,
  a time tracking circuit configured to determine a first time value in response to second request signal, the first time value determined from the clock, and
  a first adjustment circuit configured to adjust the first time value to generate an adjusted first time value that compensates for a first latency or jitter caused by converting the first request signal to the second request signal synchronized to the first clock;
wherein the second circuitry includes:
  a request generator circuit configured to generate the first request signal, and
  a second adjustment circuit configured to further adjust the adjusted first time value to generate a second time value that compensates for i) a second latency between sending the first request signal and receiving the adjusted first time value, and ii) a third latency or jitter caused by synchronizing the adjusted first time value to the second clock; and
wherein the apparatus further comprises third circuitry configured to use the second time value.

12. The apparatus of claim 11, wherein converting the first request signal to the second request signal includes:
providing the first request signal to a first pipe circuit of the first circuitry, wherein the first pipe circuit is clocked with the first clock; and
providing the first request signal to one or more second pipe circuits of the first circuitry, wherein the one or more second pipe circuits are clocked with one or more respective third clocks derived from the first oscillator, and wherein the one or more respective third clocks are respectively phase shifted versions of the first clock.

13. The apparatus of claim 12, wherein:
providing the first request signal to the first pipe circuit includes providing the first request signal to a first set of flip-flops coupled together in series; and
providing the first request signal to the one or more second pipe circuits includes providing the first request signal to one or more second sets of flip-flops, each second set of flip-flops coupled together in series.

14. The apparatus of claim 12, wherein adjusting the first time value to compensate for the first latency or jitter includes:
generating, with the first circuitry, an output signal that indicates which of the first pipe circuit and the one or more second pipe circuits first detected the first request signal.

15. The apparatus of claim 11, wherein further adjusting the adjusted first time value to generate the second time value includes determining, with the second circuitry, a value of a counter clocked by the second clock.

16. The apparatus of claim 15, further comprising:
resetting, with the second circuitry, the counter when sending the first request signal to the first circuity.

17. The apparatus of claim 16, wherein further adjusting the adjusted first time value includes using the value of the counter to further adjust the adjusted first time value.

18. The apparatus of claim 11, further comprising:
sending, from the first circuity to the second circuitry, a response signal that indicates the first circuitry is providing the adjusted first time value to the second circuitry.

19. The apparatus of claim 18, further comprising:
detecting, with the second circuitry, the response signal;
wherein further adjusting the adjusted first time value to generate the second time value includes, in response to detecting the response signal, determining, with the second circuitry, a value of a counter clocked by the second clock; and
wherein further adjusting the adjusted first time value to generate the second time value includes using the value of the counter to further adjust the adjusted first time value.

20. The apparatus of claim 11, further comprising:
generating, with the third circuitry, a time stamp using the second time value, wherein the time stamp corresponds to a packet being forwarded or transmitted or received.

* * * * *